United States Patent
Carlsen, II et al.

(10) Patent No.: US 6,351,302 B1
(45) Date of Patent: *Feb. 26, 2002

(54) ANALOG SOUND TRACK DIGITIZER

(76) Inventors: George D. Carlsen, II, 1145 Seavillage Dr., Cardiff, CA (US) 92007; Ronald W Vale, 3707 Fifth Ave #157, San Diego, CA (US) 92103

( * ) Notice: Subject to any disclaimer, the term of this patent is extended or adjusted under 35 U.S.C. 154(b) by 0 days.

This patent is subject to a terminal disclaimer.

(21) Appl. No.: 09/569,145

(22) Filed: May 11, 2000

(51) Int. Cl.$^7$ .............................. G03B 31/02; G11B 7/00
(52) U.S. Cl. ............................ 352/26; 352/37; 369/125
(58) Field of Search ............................ 352/6, 10, 26, 352/29, 1, 5, 11, 27, 37; 369/124, 125; 371/36, 37.9, 64

(56) References Cited

U.S. PATENT DOCUMENTS

| | | | | |
|---|---|---|---|---|
| 3,915,566 A | * | 10/1975 | Fisher | 352/10 |
| 3,964,826 A | * | 6/1976 | Joseph et al. | 352/10 |
| 4,085,296 A | * | 4/1978 | Keegan | 179/100.3 |
| 4,124,784 A | * | 11/1978 | Johnson et al. | 179/100.3 |
| 4,355,383 A | * | 10/1982 | Dolby | 369/120 |
| 4,577,302 A | * | 3/1986 | Allen | 369/46 |
| 4,596,008 A | * | 6/1986 | Beard | 369/107 |
| 4,599,715 A | * | 7/1986 | Beard | 369/124 |
| 4,734,903 A | * | 3/1988 | Shirai et al. | 369/107 |
| 5,231,627 A | * | 7/1993 | Paul et al. | 369/125 |
| 5,237,559 A | * | 8/1993 | Murphy et al. | 369/125 |
| 5,483,306 A | * | 1/1996 | Rodriguez | 354/10 |
| 5,526,075 A | * | 6/1996 | Carlsen | 352/26 |
| 5,543,868 A | * | 8/1996 | Tachi | 352/27 |
| 5,621,490 A | * | 4/1997 | Davis | 352/79 |
| 5,710,752 A | * | 1/1998 | Seagrave et al. | 369/97 |

* cited by examiner

Primary Examiner—Russell Adams
Assistant Examiner—Rodney Fuller
(74) Attorney, Agent, or Firm—Charles C. Logan II

(57) ABSTRACT

The system eliminates the noise, rumble and hiss from any standard 35 mm analog optical sound track. By simply feeding the film through the projector sound head in a normal manner the system automatically converts the analog optical sound tracks to digital quality. No special storing of digital data on film is required and no special digital decoder equipment is needed. The system produces noise-free sound, increased frequency response, expanded dynamic range and clarity of the dialogue. Film studios will no longer need to carry a double inventory of films having digital and analog sound tracks or to process the sound tracks for noise reduction.

12 Claims, 6 Drawing Sheets

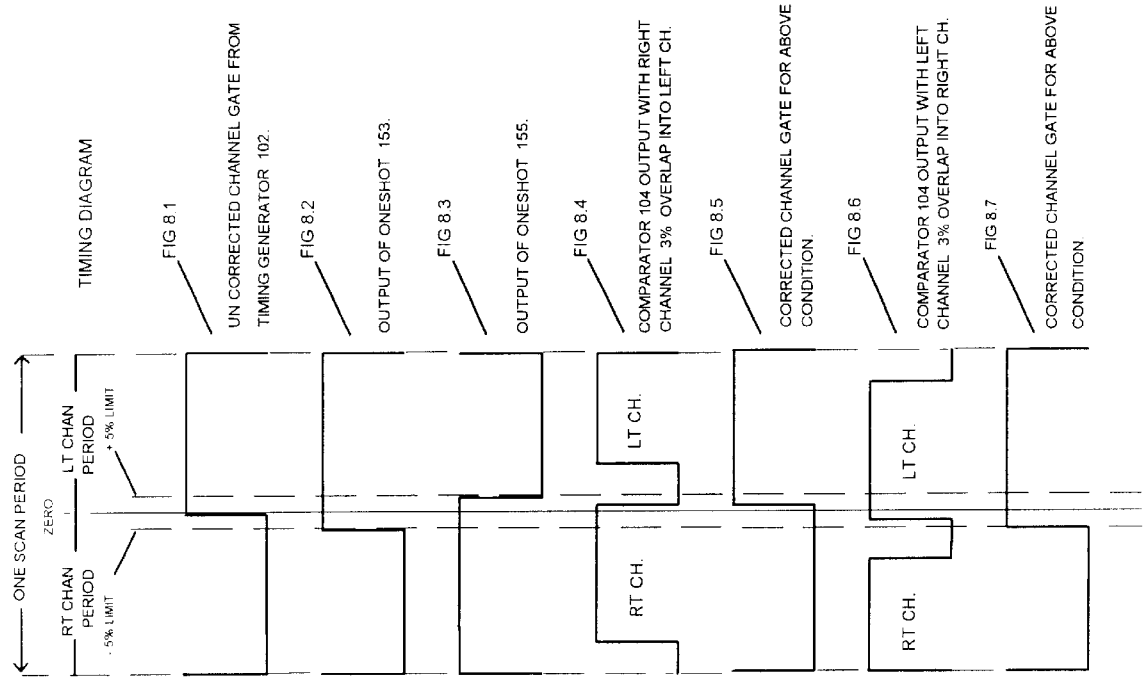
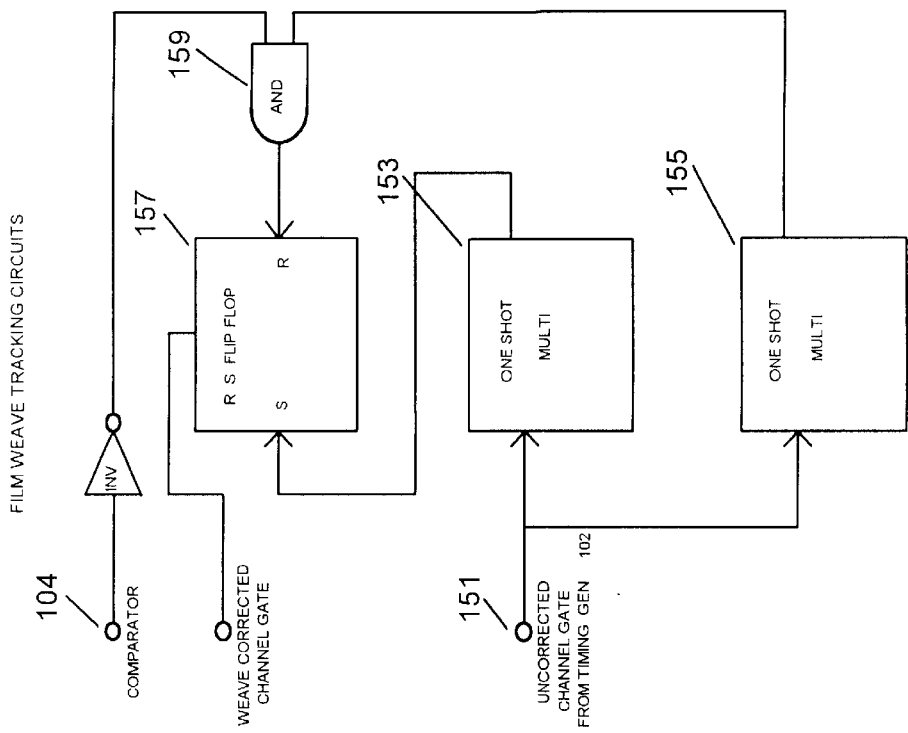
FIG. 8.

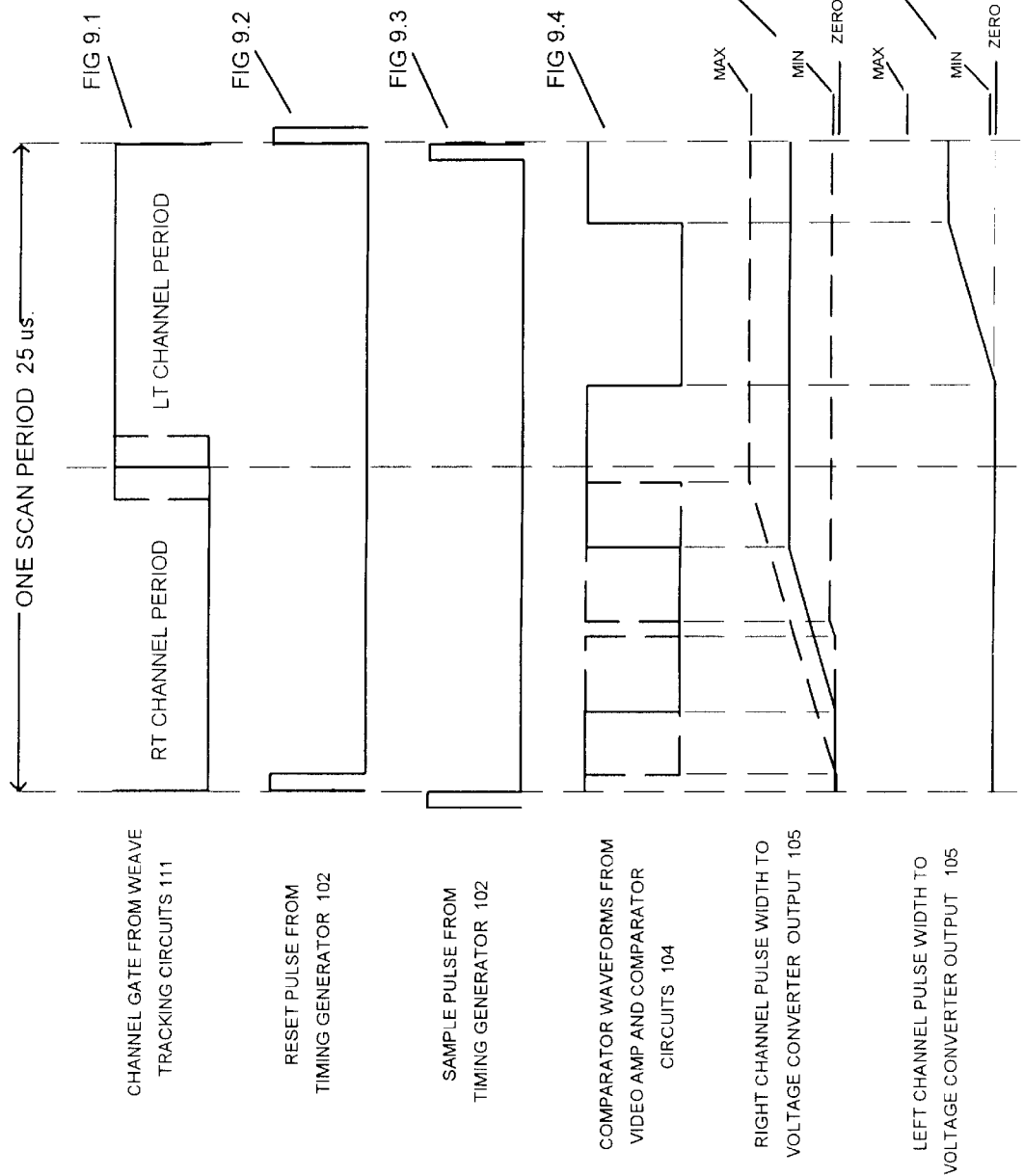

ANALOG SOUND TRACK DIGITIZER

BACKGROUND OF THE INVENTION

The invention relates to motion pictures and more specifically to an analog sound track digitizer for motion pictures.

The best prior art analog sound track digitizer is described and illustrated in the Carlsen U.S. Pat. No. 5,526,075. This earlier version of the inventors scanner was found difficult to adjust for the variations in errors in film sound tracks. Some of these included variations in the location of the sound track or weave, the minimum width of the tracks when there was no modulation, changes in film density, scratches, blotches and the inability to deal with very large noise transients caused by breaks in the film and splices.

The present standard for sound-tracks imaged on motion picture film dates back to 1967 wherein the location on, and the area covered by stereo sound tracks on film was specified. This standard describes the dimensions of the track and the related standards used today. This method places two tracks along one edge of the film which are of two types, variable density and variable area, the last of which is used almost exclusively. Inherent to this method of reproducing sound is the undesirable effect of background noise and rumble due to the nature of the plastic medium and residue of the film emulsion passing through the light beam of the photo sound detector. Dolby Corporation with its Dolby B,C,H, etc has pretty much dominated the industry both with its noise reduction systems for movie film and those for magnetic tape. However even with the best system Dolby can offer, the sound suffers distortion and amplitude variations caused by the extreme processing needed to remove random noise from between the normal sound peaks.

The introduction of the compact disk or CD with its almost perfect sound reproduction ability has stimulated interest by several companies to try and incorporate digital-quality sound on film.

This has proven to be a formidable problem because of the immense amount of digital information required to produce the multiple channel digital formats while keeping the old stereo sound tracks intact for general use by most movie theaters. Also the cost of the digital reader-heads to decode the new digital sound tracks is very high. Dolby Laboratories has recently developed its Theater Digital System that is currently being tested in a number of theaters. Sony Corporation also has introduced their digital system. It should be noted that these systems are expensive and complicated. Also the economics of necessary maintenance and the actual working-life of a digitally-encoded film sound-track is yet to be established.

None of the new digital sound systems that are being developed by these major corporations at great expense, does anything to improve old analog film sound-track that remain on the film.

The background of the present invention relates to the reproduction of sound from motion picture film. Two of the biggest hurdles to overcome in the effort to improve sound from the movie film are the increase of high frequency response and the reduction of background noise. Filters to reduce background noise also reduce high frequency response which forces the user to use compression and dynamic filter techniques. These lead to unwanted distortions and complexity.

Present analog sound track readers used in moving picture theater projectors read the variable width sound tracks on motion picture film by back lighting the sound track portion of the film with a focused slit of light which is arranged perpendicular to 1l the direction of travel of the film and just wide enough to span both tracks of the normal stereo print. A dual photo detector is placed on the opposite sides of the film to intercept the light which passes through the sound track portion of the film. The two tracks, which are transparent to light, vary in width as the film moves past the slit light source. The thickness of the slit light source and the instantaneous width of the sound track as it passes the photo detector determines the total amount of light falling on the photo detector and in turn the amount of electrical output from the detector. As the film continues to move past the detector the sound information which modulates the width of the tracks is converted to an electrical audio signal. Present photodiode detectors are linear devices and any change in the amount of light falling on the detector causes a corresponding electrical output. Electrical output changes due to different changes in the width of the sound tracks cause useful output. However changes due to residual emulsion, scratches, dirt and light aberration through the film plastic medium cause unwanted light modulation and are perceived as background noises in the electrical output.

The frequency response of present systems, irrespective of the noise limitation, is ultimately limited by the recording camera response. In reality, the limitation is based on the thickness of the slit light source used during playback. The best of the slit lenses produce about a 0.5 mil slit thickness which produces a high frequency limit of about 5 KHZ. These wide band slit lenses are usually used in special playback systems such as Dolby stereo or Surround Sound and are followed by dynamic noise filters high frequency boost amplifiers and expanders. These require that the film be specially recorded with compression techniques to improve signal and noise ratios. Generally slit sizes are used which produce high frequency limits of about 9 to 16 KHZ.

It is an object of the invention to provide an improved analog sound track digitizer having the highest accuracy and having a minimum amount of noise and distortion.

It is also an object of the invention to provide an improved analog sound track digitizer having a novel weave tracking circuit.

It is another object of the invention to provide an improved analog sound track digitizer having a circuit which allows the scanner to track minimum width tracks that are as little as ¼ the minimum standard set by the industry.

It is an additional object of the invention to provide an improved analog sound track digitizer having an automatic gain control (AGC) that was added to the video amplifier circuit which allows for changes of 10 to 1 in light density and/or film density.

It is a further object of the invention to provide an improved analog sound track digitizer having a new method for comparing the video signal with a reference signal.

It is another object of the invention to provide an improved analog sound track digitizer having novel noise canceling circuits which work independently to remove the effect of breaks or scratches as large as 1/10 of an inch on the film and blotches of any size.

SUMMARY OF THE INVENTION

The novel analog sound track digitizer for motion picture projectors has been designed to be retrofit to existing sound head housings but the system can also be incorporated in newly manufactured sound head housings.

The present invention includes structure for linearly scanning a light beam of appropriate dimensions and intensity perpendicularly across the movie film sound tracks. A photo detector is placed on the opposite side of the film to intercept the light beam such that when the light beam is directed on the dark or emulsion portion of the film there is no output from the photo detector. When the light beam is directed on the transparent portion of the film the photo detector is saturated. The resulting output of the photo detector is a group of electrical pulses each having a width proportional to the width of the related transparent portion of the film sound tracks and all having a fixed amplitude. Continuously scanning the light beam at a fixed rate and frequency across the films sound tracks produces a continuous stream of pulses each changing in width at a rate related to the instantaneous changes in the width of the transparent portions of the sound track. The scanning frequency of the beam is chosen to produce the desired high frequency response of the system, usually twice the desired frequency.

The resulting width modulated pulse streams are passed through level comparators then integrators which convert the pulse streams to audio signals. The benefits of this method are first that since the detected pulses are either zero amplitude at dark emulsion or saturated at transparent, all noise due to residual emulsion or aberration in the film medium are eliminated and other defects such as scratches and dirt have to exceed an adjustable noise threshold before they are detected. Second, the high frequency response is set by the scan rate and beam size and not limited by the characteristics of a light slit and a photo linear detector.

Different methods of scanning are possible:
1. Scanning beam of light and a fixed photo detector
   a. Cathode ray tube and a photo detector.
   b. Mirrored galvanometer and a photo detector.
   c. Scanning LED array and a photo detector.
2. Fixed slit of light and a scanning photo detector
   a. Fixed slit of light and a Videcon camera tube.
   b. Fixed spot of light and a charge coupled device (CCD).

The above methods are possible alternatives but the preferred method is (b) of group 2. It consists of a light source, not a slit, and a CCD linear scanner. In this configuration a spot of light just slightly larger than the width of the sound track is directed toward the sound track of one side of the film and the reverse side of the illuminated area is focused with a lens on the active area of the CCD linear scanner. The effective slit width of the scanner is reduced by the magnification value of the lens. For example, the CCD scanner has an aperture of 13 um and the lens has a magnification value of 2.25 which effectively reduces the slit to 6 um giving a maximum frequency response of 20.0 KHZ, more than double the present value. The scan frequency of the CCD device is set by the electronics used to drive it and is chosen to produce the desired output band width.

In preferred embodiment, the system includes a small halogen lamp with integrated condensing lens or light emitting diode or laser diode as a light source to produce a uniform light spot. The lens on the other side of the film picks up the back lighted image of the sound track and magnifies it 2.25 times then projects the resulting larger image of the sound track onto the image sensor in the scanning photo detector (CCD). The scanning photo detector effectively scans across the track image and converts the image of the sound track into one or two pulses depending on whether the film is mono or stereo. As the film moves past the photo sensor the sound tracks vary in width and the output pulses from the scanning photo detector vary in width accordingly. The scanning photo detector electronically scans the magnified image 40,000 times per second which sets the rate of the output pulse or pulses. The scanning photo sensor consists of an integrated row of photo sensors in a silicon chip numbering 512 which are sequentially read by the on chip scan circuitry. As each of the 512 photo sensors is read an output voltage is produced from each which is proportional to the amount of light falling on it and when all are combined a video signal is produced which is a profile of the light intensity across the scanned image. The effective width of the scan line made by the photo sensor array is 6 um or 0.00024 inches. This line thickness determines the resolution or frequency response of the system. The very best present systems have a maximum frequency response of about 10 KHZ, and are followed by a high frequency boost amplifier to achieve a 16 to 18 KHZ response. The novel analog sound track digitizer has a response of 20 KHZ requiring no boost circuits.

The scanning photo detector output is connected to a pulse width modulation (PWM) electronics circuit where the pulse stream is converted into one or two channels of audio. It is then transmitted to pre amps and amplifiers of the existing theater sound system. The sound thus produced is noise-free, has an increased frequency response, has an expanded dynamic range and produces an increased clarity of dialogue.

Normally there are only two sound tracks on 35mm film for stereo sound. Some older films have only one sound track. The number of pulses from the scanner for each scan is equal to the number of sound tracks on the particular film being used. For stereo sound two pulses are generated. Each of the two pulses from the scanner which are varying in width relative to the sound tracks are steered to a separate circuit where it is integrated with respect to time and converted to an electrical audio signal.

The pulses from the scanner have only two discrete levels zero and maximum. The two levels represent no light or full light levels on the scanner active area. This provides a noise threshold wherein the noise sources on the film must have a contrast equal to the sound track area contrast or be ignored by the scanner. By its nature this eliminates emulsion residue and plastic film medium at the aberration effects on the output signal. Other sources of noise which cause unwanted pulse width modulation are required to exceed another threshold set by the integrating circuitry before conversion to audio. A potentiometer in the circuitry of the PWM electronics box can be adjusted to vary the threshold level from zero to 100%. By using 20% of the amplitude, any noise has to be 80% of the total amplitude before it will be sensed at all.

The improved analog sound track digitizer has incorporated a novel weave tracking circuit to follow any side to side movement of the sound track due to film processing errors or projector problems. Another circuit has been added which allows the scanner to track minimum width tracks that are as little as ¼ the minimum standard set by the industry. An automatic gain control (AGC) has been added to the video amplifier circuit which allows for changes of 10 to 1 in light intensity and or film density. Also incorporated therein is a new circuit for comparing the video signal with a reference signal. The new video comparator has been designed to allow the user to tune the (cross-modulation) distortion inherent on a film print to zero. Additionally, new noise canceling circuits are included which work independently to remove the effect of breaks or scratches as large as ⅒ of an inch on the film and blotches of any size.

DESCRIPTION OF THE DRAWING

FIG. 8 is a block diagram of the film weave control circuits; and

FIGS. 9.1–9.6 show the wave forms associated with pulse width to voltage convertors.

DESCRIPTION OF THE PREFERRED EMBODIMENT

Figure 1:
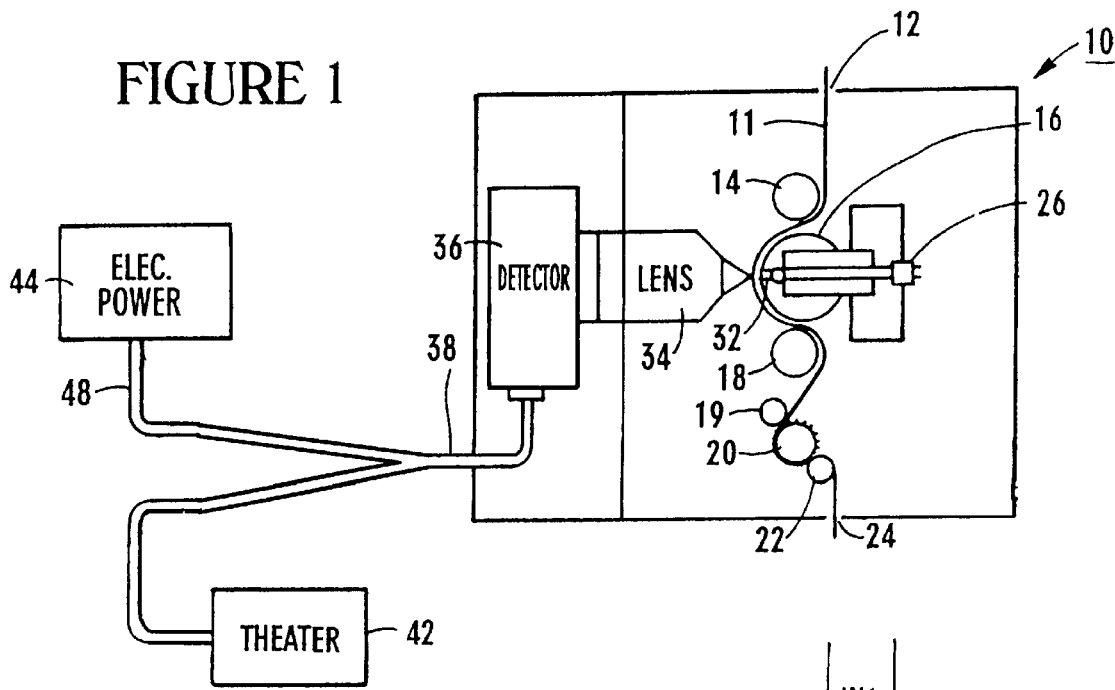
FIG. 1 is a schematic illustration of the novel sound system that is incorporated into the sound head housing.

The analog-digitizer sound system will now be described by referring to FIGS. 1–4 of the drawings. The basic components of the system are mounted in the sound head housing of a motion picture projector system. Normally the sound head system is located immediately below the projector head. In FIG. 1 the sound head housing is generally designated numeral 10. The sound head housing generically functions as a movie film reader assembly. Motion picture film 11 enters through an entrance opening 12 and passes around a guide roller 14. Next it passes around capstan fly wheel 16, guide rollers 18 and 19 and then around drive sprocket 20. Then it passes around guide roller 22 and it exits through an opening 24 and is wound on take-up reels (not shown).

Light source 26 which could be a halogen lamp, light emitting diode or laser diode illuminates the back of the sound track portion of the film. Lens 34 picks up the back light image of the sound track and magnifies it 2.25 times and then projects the resulting larger image of the sound track onto the image sensor of the analog sound track digitizer 36. Analog sound track digitizer 36 takes the form of a charge coupled scanning detector (CCD) and all electronics circuits wherein the pulse stream from the (CCD) scanner is converted to one or two channels of audio for output to the preamps, amplifiers, and speakers in theater 42 through interconnect cable 38. Power 44 is supplied to the system through cable 48 which is combined with cable 38 to power the analog sound track digitizer 36.

Figure 2:
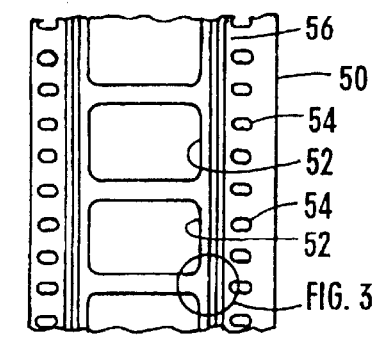
FIG. 2 illustrates a portion of a film strip showing an analog sound track thereon.
Figure 3:
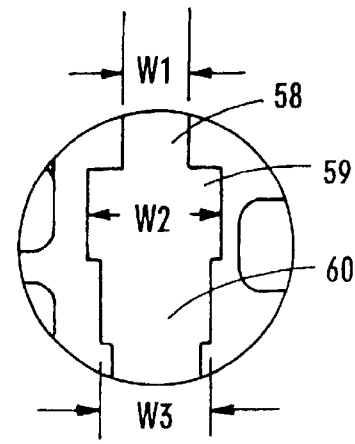
FIG. 3 is an enlarged schematic illustration of the sound track seen in FIG. 2.
Figure 4:
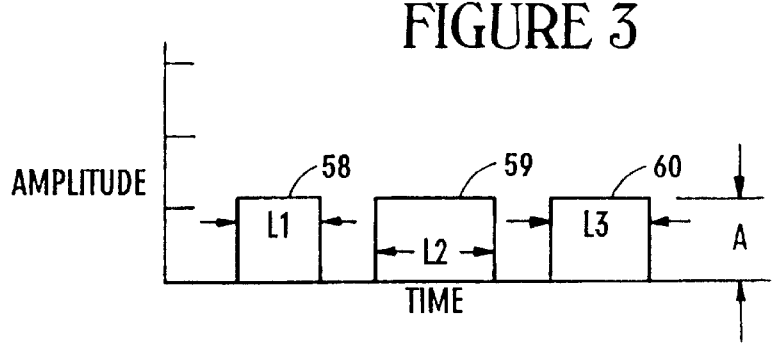
FIG. 4 is a schematic illustration of the pulse produced by the instantaneous width of the analog sound track in FIG. 3.

A portion of a strip of film 50 is illustrated in FIG. 2 having picture frames 52, sprocket apertures 54 and a stereo sound track 56. In FIG. 3 a portion of the stereo sound track is magnified to illustrate the analog sound track on the film strip and its clear strip having various width portions 58,59 and 60. In FIG. 4, widths 58, 59 and 60 have been transformed into block pulse signals each having a constant amplitude A but variable widths L1, L2 and L3. The widths L1, L2 and L3 correspond respectively to sound track width portions 58, 59 and 60. The widths are produced by the analog sound track digitizer 36.

Figure 5:
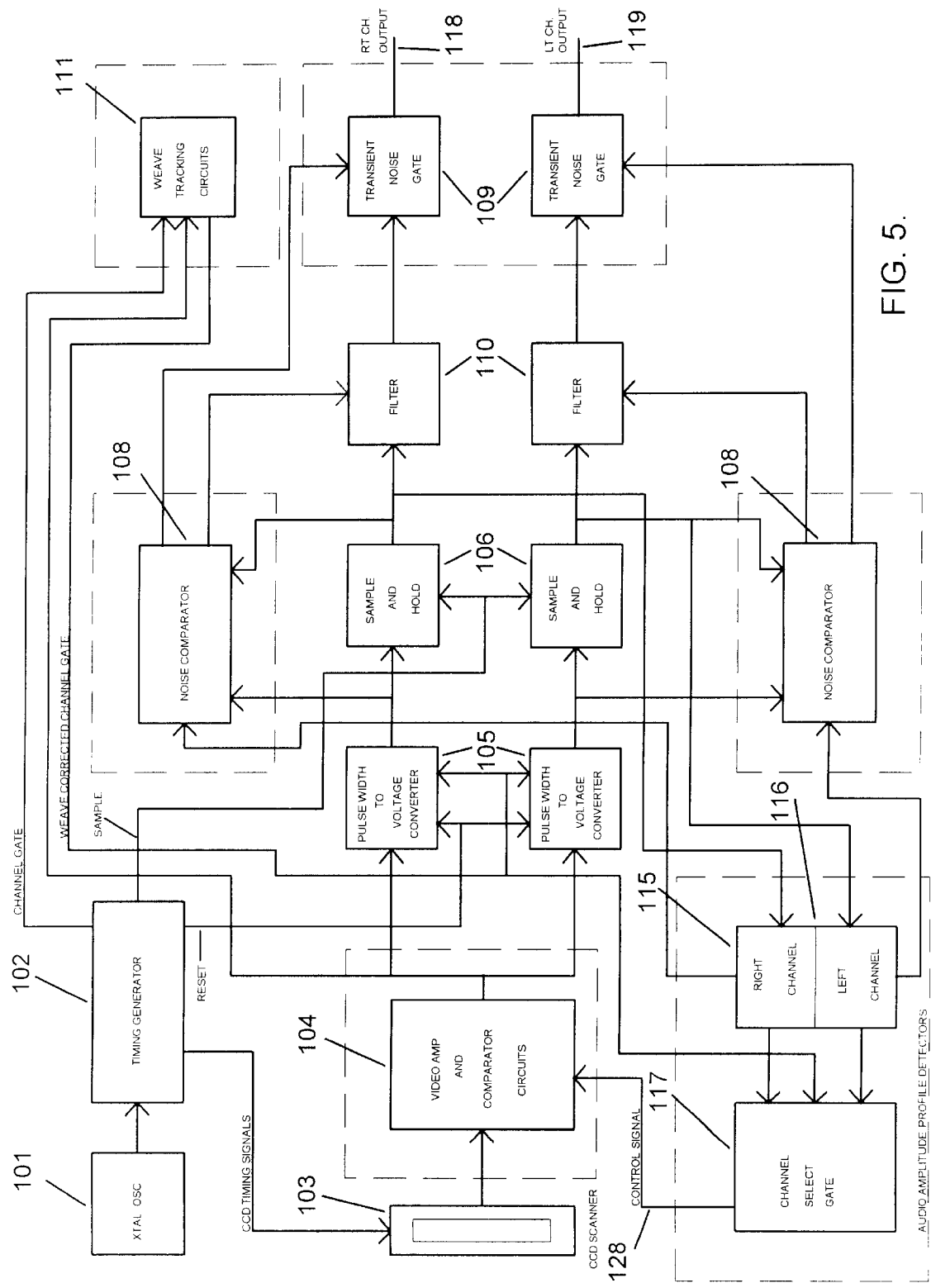
FIG. 5 is a block diagram of the reader system.

Referring to FIG. 5, a block diagram of the reader system is shown with the areas outlined by dash lines that represent changes and improvements. The following is a cursory description of the reader's functions.

The timing and clocking of the circuits is provided by a crystal oscillator 101 and a timing generator 102 which provide all synchronization and control pulses for all parts of the circuit. CCD scanner 103 receives an image of the variable area sound track and converts this optical image to one or more pulses each having a width in time related to the measured width on film of the particular sound track being scanned. Generally two pulses are generated representing the two stereo channels found on standard movie theater prints. The two pulses are then routed to the Video Amplifier And Comparator Circuits block 104 where they are cleaned up and standardized for application to the Pulse Width To Voltage Converters 105 where the width of the pulse is converted to a related voltage level. This happens 40,000 per second which is the rate at which the CCD camera updates its scan of the sound tracks. FIGS. 9.1–9.6 show the wave forms associated with the Pulse Width To Voltage Converters 105. FIG. 9.1 is a 25 us square wave on the timing generator 102 which establishes the time period assigned to the right and left channels during each scan of the sound track. FIG. 9.4 shows the right and left scanner pulses conditioned by the Video Amplifier Comparator Circuits 104 which are converted to voltage levels as shown in FIG. 9.5 and FIG. 9.6. FIG. 9.2 is a pulse which resets the right and left Pulse Width To Voltage Converters 105 after each scan of the sound track. Before the converters 105 are reset by reset pulses (see FIG. 9.2), the voltage levels they hold are transferred to Sample And Hold Circuits 106 where the right and left channel voltage levels are held during the next scan. The output of the Sample And Hold Circuits step by step become the right and left channel audio output waveforms which are filtered of high frequency sampling components by filters 110. Noise Comparators 108 compare the current sample at the output of Pulse Width To Voltage Converters 105 with the stored previous sample at the output of the Sample And Hold Circuits 106. If the amplitude of the new scan exceeds the stored sample of the previous scan by a predetermined amount and rate, the Noise Comparator 108 senses it and outputs a pulse which turns on the Transient Noise Gate 109 which in turn bypasses the noise pulse to ground.

Audio Amplitude Envelope Detectors 115 and 116 each produce a voltage level which follows the long term amplitude profile of the right and left audio output channels 118 and 119 respectively. These voltage levels, one common to each channel, are used to automatically set the sense level of the Noise Comparator 108 for each channel so that the noise detector threshold is raised for high output levels and lowered for low or zero levels. Secondly the two voltage levels are gated by Channel Select Gate 117 and directed to the Video Amplifier And Comparator Circuits 104 where they are used to establish the proper comparator reference dc level with respect to the maximum width of the pulses generated at the CCD scanner.

An added circuit 111 monitors the side to side movement of the two channel pulses, generated by the Video Comparator 104, with respect to the Channel Gate signal (See FIG. 9.1). The two channel pulses must exactly straddle the positive going edge of the Channel Gate square wave (See FIGS. 9.1 and 9.4). If the channel pulses move in either direction such that one or the other of the channel pulses intersects the positive going edge of the Channel Gate square wave, the circuit in 111 will shift the positive going edge so that neither channel pulse can encroach on the channel gate period of the other pulse. The side to side motion referred to here is caused by side to side Weave Motion of the film as it passes the CCD scanner.

Figure 6:
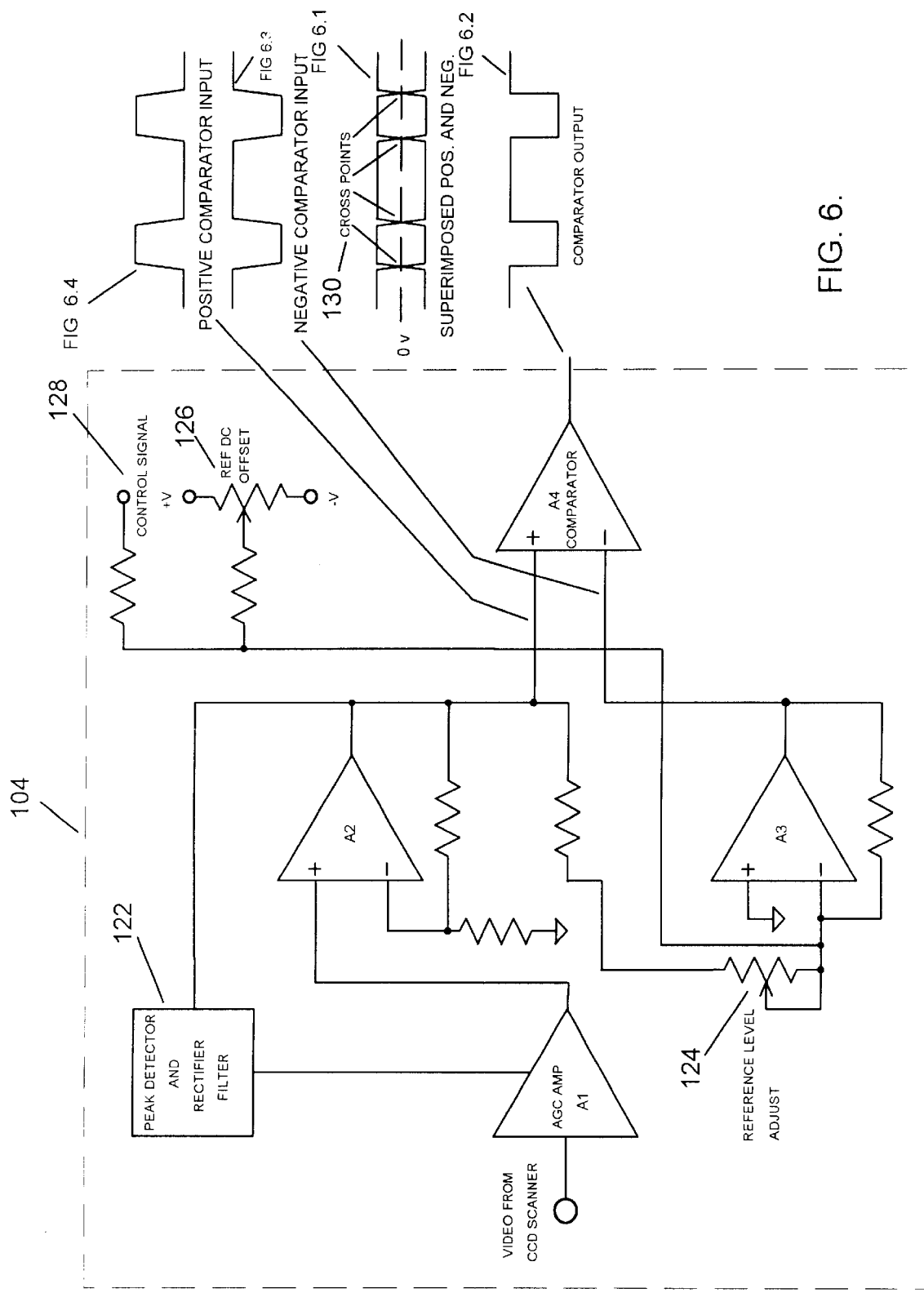
FIG. 6 is a block diagram of the video amplifier and comparator circuit.

FIG. 6 shows the Video Amplifier And Comparator Circuits. The circuits are composed of a video amplifier section with amplifiers A1, A2, and A3 and a comparator section with comparator device A4. The video signal from the CCD scanner 103 is input to A1 where it is amplified and coupled to A2 for additional gain. The output of amplifier A2 is connected to the positive input of the comparator device A4. A peak detecting circuit 122 is also connected to the output of amplifier A2 which generates a negative feedback dc voltage and has a fixed threshold. This feedback begins reducing the gain of amplifier A1 when the output of A2 reaches a desired level. This AGC (automatic gain control) action holds the output pulses from A2 at a fixed amplitude even though the amplitude of the input pulses to A1 is changing. The output of A2 takes a third path to the inverting input of amplifier A3. A3 inverts the polarity of its pulses and has a gain adjusting variable resistor 124 called Reference Level Adjust. A3 output becomes the inverting input source for comparator A4. The inverting input of amplifier A3 has two additional input sources, a dc offset adjust 126 and a control signal input 128. The dc offset adjust is used to establish the dc operation levels of the two inputs to the comparator A4. The resulting effective combination of outputs A2 and A3 with respect to the input of comparator 104 and the dc offset produced by the Reference DC Offset pot 126 can be seen in FIG. 6.1 where the positive pulse train from A2 is superimposed over the negative pulse train from A3 and with the addition of the dc offset which positions the two pulse trains with respect to each other such that they cross each other at a zero voltage level 130. The resulting output of the comparator A4 can be seen in FIG. 6.2. The use of the inverted signal of A3 as a comparator reference signal for the output signal of A2 keeps the cross points 130, where the comparator output changes state, to always be at zero potential even if the amplitude or the dc level of the input pulse train were to change. Additionally, the cross point speed of the two signals is doubled because the pulses are moving in opposite polarities, this reduces cross point jitter noise. The remaining input, Control Signal 128 is a dc voltage derived from the sound track reader audio output signals which represents the overall amplitude profile of the outputs. This dc level is used to correct the cross points at the input of the comparator A4 when high amplitude signals are read from the sound track. Finally, the Ref DC Offset pot 126 when made available as a manual adjustment allows the user to tune out a particular kind of distortion found in variable area sound tracks called Cross Modulation Distortion.

Figure 7:
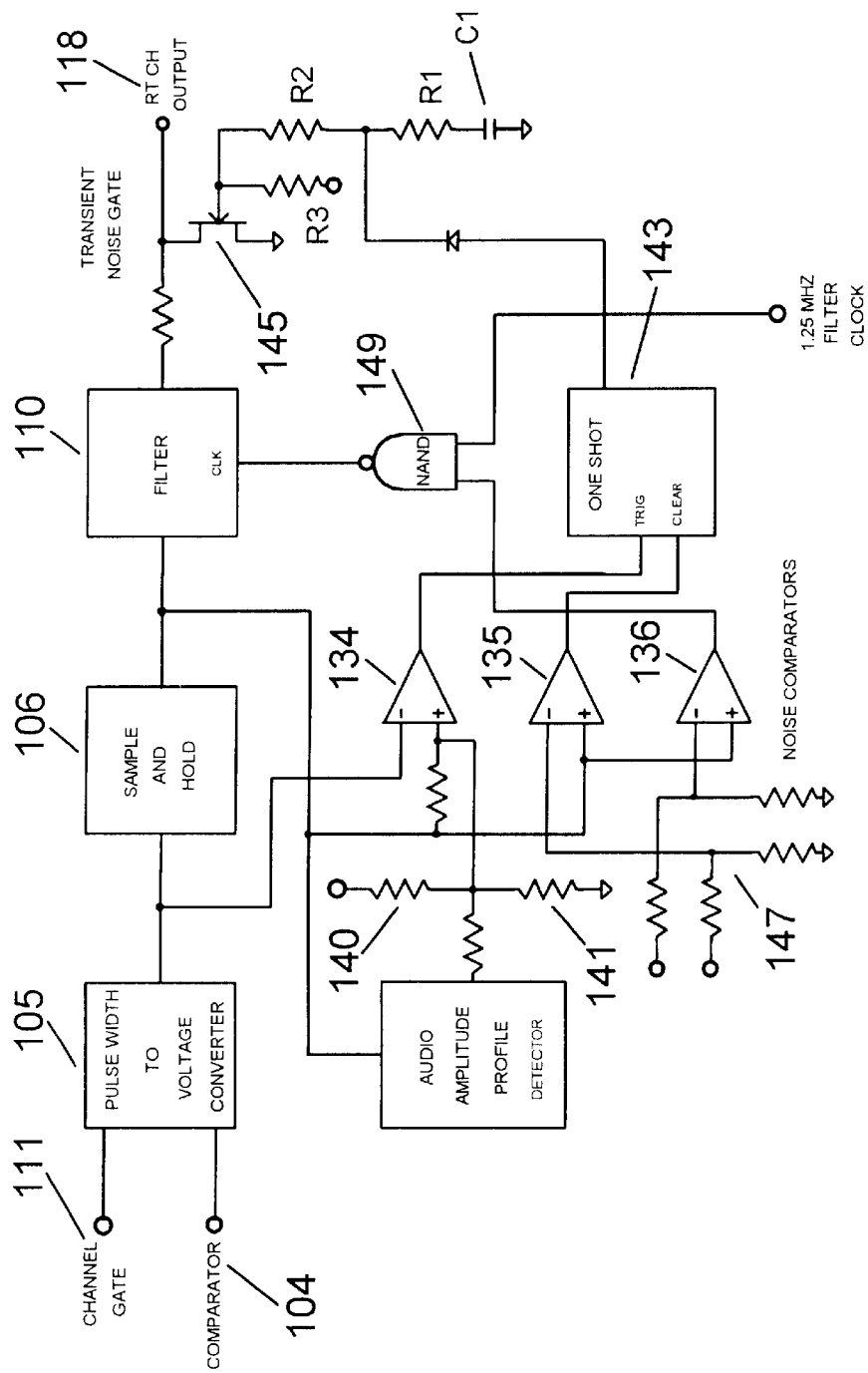
FIG. 7 is a block diagram of the noise reduction circuits.

The circuit in FIG. 7 is one of two identical circuits, one for the right and the other for the left channel. The output pulses from the Video Amplifier And Comparator Circuits 104 are applied to the input of the Pulse Width To Voltage Convertor 105 where the width of the input pulse produces an output corresponding voltage level. At the end of the pulse width to voltage conversion period Sample And Hold Circuit 106 samples the voltage and stores the value. The output of Sample And Hold circuit 106 connects to the inputs of three comparators 134, 135 and 136. The Pulse Width To Voltage Converter 105 is then reset in preparation for the next pulse from the Video Amplifier And Comparator Circuits 104. The next pulse input 116 is then converted to a new voltage level depending on the width of that pulse. The output of the Pulse Width To Voltage Converter 105 is connected to the remaining input of comparator 134. Comparator 134 compares the stored voltage sample from the Sample And Hold Circuit 106 with the last voltage level generated by the Pulse To Width Voltage Converter 105, if the last voltage level taken is a noise pulse that exceeds the value stored in the Sample And Hold Circuit 106 plus the dc value contributed by the resistor network 140 and 141, comparator 134 will output a trigger signal to the one-shot multivibrator 143 which in turn applies a fixed width pulse to the gate of transistor 145 which in turn shorts the audio output line 118 to ground preventing the noise pulse from reaching the audio output terminal of the reader. A dc control signal representing an amplitude profile derived from the same channel audio output signal is introduced to the positive input of comparator 134 with the result that comparator 134 is made less sensitive to noise pulses when the output audio signal level is high and more sensitive at low or zero signal levels. The fixed pulse width which is output from one-shot multivibrator 143 is established at a value which will cancel transient noise pulses caused by breaks in the film in the sound track area which are a maximum of a tenth of an inch wide. Since not all noise pulses have the same duration, detected noise pulses shorter than the one-shot multivibrator 143 period are detected by comparator 135 when they go to zero. Comparator 135 then sends a reset pulse to the one-shot multivibrator 143 to terminate its output pulse early thereby allowing transistor 145 to release the audio output line 118. The resistor network at transistor 145 functions as follows. When one-shot multivibrator 143 fires, transistor 145 is instantly turned on and capacitor C1 begins to charge. If the pulse from one-shot multivibrator 143 is short, capacitor C1 will have only a small charge and transistor 145 will turn off quickly. As the width of the one-shot pulse increases capacitor C1 will receive a larger and larger charge with the result that for longer noise pulses transistor 145 will not turn off rapidly to kill the noise pulse but will turn off more slowly the wider the one-shot pulse becomes. This reduces the noise circuit turnoff thump at the end of long noise pulses. Finally, comparator 136 senses a zero voltage condition at the output of the Sample And Hold Circuit 106 which indicates that a blotch exists on the film which completely cuts off any light passing through the sound track area. Normally there is a dc bias at the output of the Sample And Hold Circuit 106 because the clear area of a variable area sound track never closes completely. This is called the bias line and is used to reduce negative signal swing clipping in sound track readers. If the minimum bias disappears an abnormal blockage is indicated. At this point the positive comparator input voltage from the Sample And Hold Circuit 106 is compared with a minimum reference set by resistor network 147 on the negative comparator input. The output of comparator 136 drops to zero if the comparator 136 positive input drops below the reference set by resistors 147 on the negative input. The output of comparator 136 is connected to one input of a nand gate 149. The other input to the Nand gate is a 1.25 mhz clock signal. The output of the Nand gate 149 is connected to the switched capacitor output filter 110 clock input terminal. This clock signal is required for audio output switched capacitor filter 110 to function. When comparator 136 output drops to zero the 1.25mhz clock signal for the audio output filter 110 is interrupted causing filter 110 output to freeze thereby holding the last level before the loss of the clock signal and not allowing the output signal to drop to zero with a resulting output noise pulse.

In order to provide separate isolated paths for each channel a control signal, Channel Gate 151, which originates from the master Timing Generator 102 in FIG. 5 is used as a gating signal to route the two channel pulses produced at the output of the Video Amplifier And Comparator Circuit 104 to their proper individual paths. This Channel Gate signal is fixed in time at a 50% duty cycle, half of the total period is allotted to the right channel and half to the left channel. However, the two channel pulses generated by the CCD scanner 103 and conditioned by the Video Amplifier And Comparator Circuits 104 are not locked to the Channel Gate signal and will vary in position with respect to it. A problem exists if the two channel pulses from the Video Amplifier And Comparator Circuits 104 shift position with respect to the Channel Gate 151 and actually collide with it. This is usually caused by the film weaving as it passes the sound track reader particularly with high signal levels. When this happens, depending on which way the shift took place, portions of one channel will spill over into the other channel causing distortion and clipping. To prevent this the circuit in FIG. 8 was included in the design of the reader. The basis for this corrective measure asserts that if the two channel pulse signal from the Video Amplifier And Comparator Circuits 104 does not have a predictable location within the Channel Gate period then the Channel Gate must move in order to align with it. Referring to FIG. 8, the signal from Channel Gate 151 triggers a pair of one-shot multivibrators 153 and 155 on its negative transition which is the beginning of the CCD scan period. These one-shot multivibrators have periods which will set the limits for the amount the Channel Gate 151 will be allowed to shift to accommodate any shift of the two channel pulses. The values were set at 5% of the total scan period. One-shot multivibrator 153 limits the excursion of the left channel of 5% into the right channel period and one-shot multivibrator 155 limits the right channel to 5% into the left channel period. The circuit functions as follows (See FIGS. 8–8.7). The signal from Channel Gate 151 has a 50% duty cycle which is fixed so in order to move it, it will have to be regenerated. When the signal from Channel Gate 151 goes negative the two one-shot multivibrators are both triggered. One-shot multivibrator 153 in turn triggers RS flip flop 157 so that its output transitions negative. One-shot multivibrator 155 transitions high, see waveforms 8.2 and 8.3. The other input to the weave control circuit is from the Video Amplifier And Comparator Circuits 104. This signal is inverted and tied to one input of an AND gate 159, the other input to the and gate 159 is the output of one-shot multivibrator 155.

Now assume a relationship between Channel Gate 151 and the two channel pulses that places the right channel pulse 3% into the left channel period, see FIG. 8.4. In this situation when Channel Gate 151 goes negative it triggers one-shot multivibrators 153 and 155, one-shot multivibrator 153 triggers flip flop 157 changing its output to negative and holding it for the duration of the one-shot multivibrator 153's period, see waveform FIG. 8.2. One-shot multivibrator 155 changes to a high level enabling one input of the AND gate 159 (see FIG. 8.3) while the inverted right channel pulse from comparator circuits 104 enables the other input to AND gate 159, (see FIG. 8.3). This configuration holds the output of AND gate 159 high until the right channel changes to a low level wherein the output of the AND gate 159 also goes low and changes the flip flop output to a high level enabling the left channel time period. Next assume that the left channel is 3% into the right channel period, see FIG. 9.6. Again the falling of the Channel Gate 151 triggers both one-shot multivibrators. In this case, one-shot multivibrator 153 triggers flip flop 157 changing its output to negative and holding it for one-shot multivibrator 153's period. One-shot multivibrator 155's output enables one input of the AND gate and the inverted right channel pulse from circuits 104 enables the other input to the AND gate 159 holding the output of the AND gate 159 high until the right channel signal goes negative which changes the flip flop a57 output to the high state enabling left channel about 5% before the 50% transition of the Channel Gate 151, see FIG. 8.7.

What is claimed is:

1. An apparatus for improved processing of electrical pulses into audio signals, said electrical pulses being produced during the scanning of variable area motion picture analog sound tracks using scanners such as "charged coupled devices", CCD's,:

an amplitude limiting video amplifier means and a modified comparator circuit means for receiving said electrical pulses, said electrical pulses having a width in time related to the scanned width on film of the particular variable area sound track being scanned; said electrical pulses passing through an amplifier (A1), said amplifier (A1) being one section of a four section video amplifier integrated circuit wherein said electrical pulses are amplified, then passing said amplified output pulses to the input of a second amplifier (A2), (A2) being another section of said four section video amplifier integrated circuit for additional gains; the output of amplifier (A2) being connected to the positive input of a comparator device A4 and further being connected also to the inverting input of an amplifier (A3), (A3) being another section of said four section video amplifier integrated circuit which inverts the polarity of its input pulses; the output of amplifier (A3) becomes the inverting input source of said comparator device (A4); the use of the inverted signal of amplifier (A3) as a comparator reference signal with respect to the output signal of amplifier (A2) keeps the cross points where comparator (A4's) output changes state, to always be a chosen set potential even if the amplitude or the dc level of the input pulse train were to change; the cross point speed of the two signals imputed to the said comparator (A4) is doubled because the pulses are moving in opposite polarities and this reduces cross joint jitter noise.

2. An apparatus as recited in claim 1 further comprising peak detecting circuit means also connected to the output of amplifier (A2) which generates a negative feedback dc voltage and has a fixed threshold; said negative feedback begins reducing the gain of amplifier (A1) when the output (A2) reaches a desired level, this automatic gain control (AGC) action holds the output pulses from (A2) at a fixed amplitude even though the amplitude of the input pulses to (A1) is changing.

3. An apparatus as recited in claim 1 further comprising a gain adjusting variable resistor (REFERENCE LEVEL ADJUST) inserted in series with the output of said video amplifier (A2) to said inverting input of said amplifier (A3).

4. An apparatus as recited in claim 3 wherein said inverting input of amplifier (A3) has two additional input sources, a dc offset adjust means and a control signal input means; said de offset adjust means is used to establish the dc operating levels of the two inputs to said comparator (A4); the resulting effective combination of said output amplifiers (A2) and (A3) with respect to the input of comparator (A4) and the dc offset produced by the REFERENCE DC OFFSET pot whereby the positive pulse train from amplifier (A2) is superimposed over the negative pulse train from amplifier (A3) and with the addition of said dc offset adjust means which positions the two pulse trains with respect to each other an a zero voltage level.

5. An apparatus as recited in claim 4 further comprising another input for amplifier (A3) in the form of a control signal that is a de voltage derived from the sound track reader audio output signal that represents the overall amplitude profile of the output; this dc level is used to correct the cross point at the input of comparator (A4) when high amplitude signals are read from the sound track.

6. An apparatus as recited in claim 4 wherein said REFERENCE DC OFFSET pot has manual adjustment means that allows the user to tune out a particular kind of distortion found in variable area sound tracks called CROSS MODULATION DISTORTION.

7. An apparatus as recited in claim 1 further comprising at least a first audio output line to a first channel audio output terminal said first audion output line comprising:

a pulse width to voltage converter is connected in series to said output of said video amp and comparator circuits; a sample and hold circuit is connected to said pulse width to voltage converter to sample the voltage from said pulse width voltage converter and to store that value of the voltage; a switched capacitor filter is connected in series to the output of said sample and hold circuits; output of said sample and hold circuits is connected to the input of a first noise comparator; electronic means connected to said first noise comparator that allows the stored voltage sample from SAMPLE AND HOLD CIRCUIT to be compared with the last voltage generated by the VOLTAGE WIDTH TO VOLTAGE CONVERTER so that if the last voltage level taken is a noise pulse that exceeds the value in the SAMPLE AND HOLD CIRCUIT, said first noise comparator will output a signal that causes said audio output line to be shorted to ground thereby preventing the noise pulse from reaching said audio output terminal.

8. An apparatus as recited in claim 7 further comprising electronic circuitry means connected to said first noise comparator which cancel transient noise pulses caused by breaks in the film in the sound track area which are a maximum of a tenth of an inch wide.

9. An apparatus as recited in claim 7 further comprising a second noise comparator having electronic circuitry means that reduces the noise circuit turn-off thump at the end of long noise pulses.

10. An apparatus as recited in claim 7 further comprising a third noise comparator having electronic circuitry means that senses a zero voltage condition at the output of said SAMPLE AND HOLD CIRCUIT which indicates that a blotch exists on the film which completely cuts off any light passing through the sound track area, said electronic circuitry means prevents said output signal from dropping to zero and therefore prevents the output noise pulse that would have been produced.

11. An apparatus as recited in claim 1 further comprising anti-weave means for preventing portions of one audio channel from spilling over into the other audio channel caused by film weave thereby producing distortion and clipping.

12. An apparatus as recited in claim 11 wherein said anti-weave means comprises a channel gate and means for allowing said channel gate to move back and forth so that a two channel pulse signal from said Video Amplifier And Comparator Circuits will have a predictable location within said channel gate.

* * * * *